US005896639A

United States Patent [19]

Chen

[11] Patent Number: 5,896,639

[45] Date of Patent: Apr. 27, 1999

[54] HYDRAULIC PULLER

[76] Inventor: Jui-Nien Chen, Taichung Hsien, Taiwan

[21] Appl. No.: 08/516,067

[22] Filed: Aug. 17, 1995

[51] Int. Cl.[6] .................... B23P 19/04

[52] U.S. Cl. .................... 29/261

[58] Field of Search .................... 29/252, 261, 262

[56] References Cited

U.S. PATENT DOCUMENTS

| | | | |
|---|---|---|---|
| 2,003,756 | 6/1935 | Nagel | 29/252 |
| 2,484,129 | 10/1949 | Taylor | 29/261 |
| 5,233,740 | 8/1993 | Chen | 29/252 |

*Primary Examiner*—Robert C. Watson
*Attorney, Agent, or Firm*—Varndell Legal Group

[57] ABSTRACT

A hydraulic puller for removing an element from an axle, including a hydraulic pipe, a pawl assembly mounted on the hydraulic pipe and controlled to catch the element to be removed from an axle, a movable rod movable fastened to the hydraulic pipe, and an oil tank assembly connected to the hydraulic pipe by a connecting pipe. The oil tank assembly comprising an air permeable oil container filled with a hydraulic oil and covered by a casing, and the casing having two air holes at two opposite locations. The hydraulic puller further having a hand lever, a piston rod moved by the hand lever to force the hydraulic oil out of the oil container late the hydraulic pipe to move the movable rod out of the hydraulic pipe, and spring means fastened to the hydraulic pipe to automatically move the movable rod back to its former position. The connecting pipe has an adjustment hole, a safety oil valve fastened to the adjustment hole by a rubber cushion and a safety screw to automatically regulate the inside pressure of the hydraulic pipe; and hand lever is pivoted to a holder plate rotatably mounted around the connecting pipe inside the casing.

1 Claim, 8 Drawing Sheets

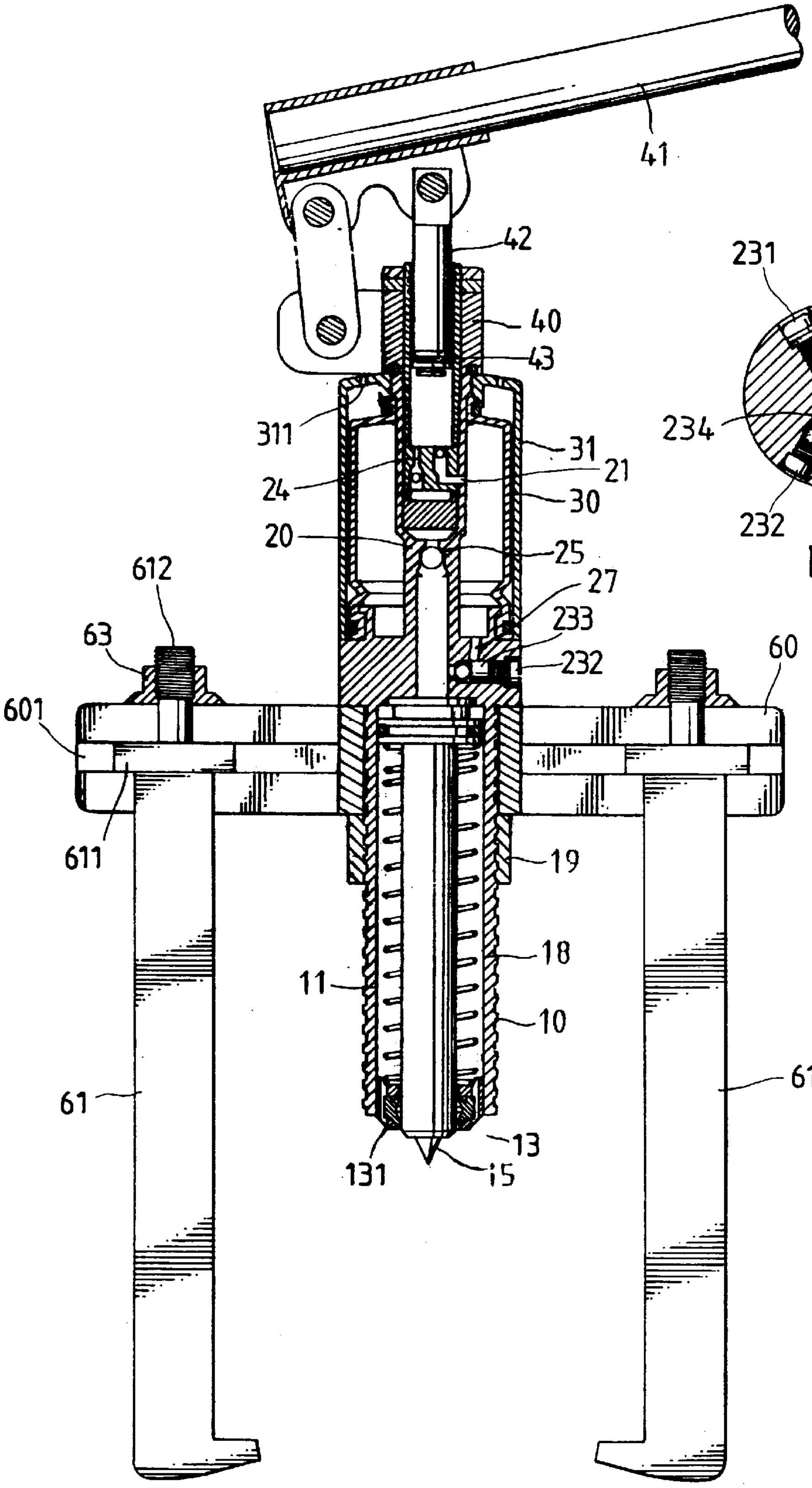
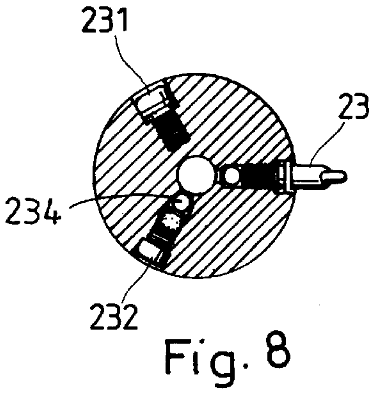
Fig. 8
FIG. 7

HYDRAULIC PULLER

CROSS-REFERENCE TO RELATED APPLICATION

The present invention is an improvement over the Hydraulic Puller described in U.S. Pat. No. 5,233,740.

In removing a bearing or axle bush from an axle, the rust must be knocked off so that the bearing or axle bush can be removed. However, the bearing, axle bush or the axle itself tends to be damaged when knocking off the rush. FIG. 1 shows a puller designed to eliminate this problem. The puller comprises a screw rod and two symmetrical pawls mounted on the screw rod. However, this structure of puller still has drawbacks. Because rotating the screw rod consumes such labor, it needs two operators to operate the puller. When the screw rod is rotated, the axle to which the screw rod is stopped tends to be rotated at the same time, and a third operator is needed to hold the axle in position. Because the pawls are moved on the screw rod by rotating the thread of the screw rod, the moving speed of the pawls on the screw rod is slow. Furthermore, much working space is needed for rotating a spanner to drive the screw rod, therefore this structure of puller is not suitable for use in a narrow working area.

U.S. Pat. No. 5,233,740, entitled "Hydraulic Puller" and issued to the present inventor, disclosed a hydraulic puller which eliminates the aforesaid drawbacks. However, this hydraulic puller must be operated at a a certain angle because the hand lever can not be rotated through 370 degrees.

SUMMARY OF THE INVENTION

This present invention has been accomplished to provide a hydraulic puller which improves the structure of the disclosure of U.S. Pat. No. 5,233,740. It is one object of the present invention to provide a hydraulic puller which permits the hand lever to be rotated through 360 degrees. It is another object of the present invention to provide a hydraulic cylinder which has a safety oil valve which automatically regulates the inside pressure of the hydraulic pipe for a safety operation.

BRIEF DESCRIPTION OF THE DRAWINGS

FIG. 7 is still another sectional view of the present invention, showing the installation of the safety screw.

FIG. 8 is an enlarged scale showing the screw control valve and the adjustment hole.

DETAILED DESCRIPTION OF THE PREFERRED EMBODIMENT

Figure 1:
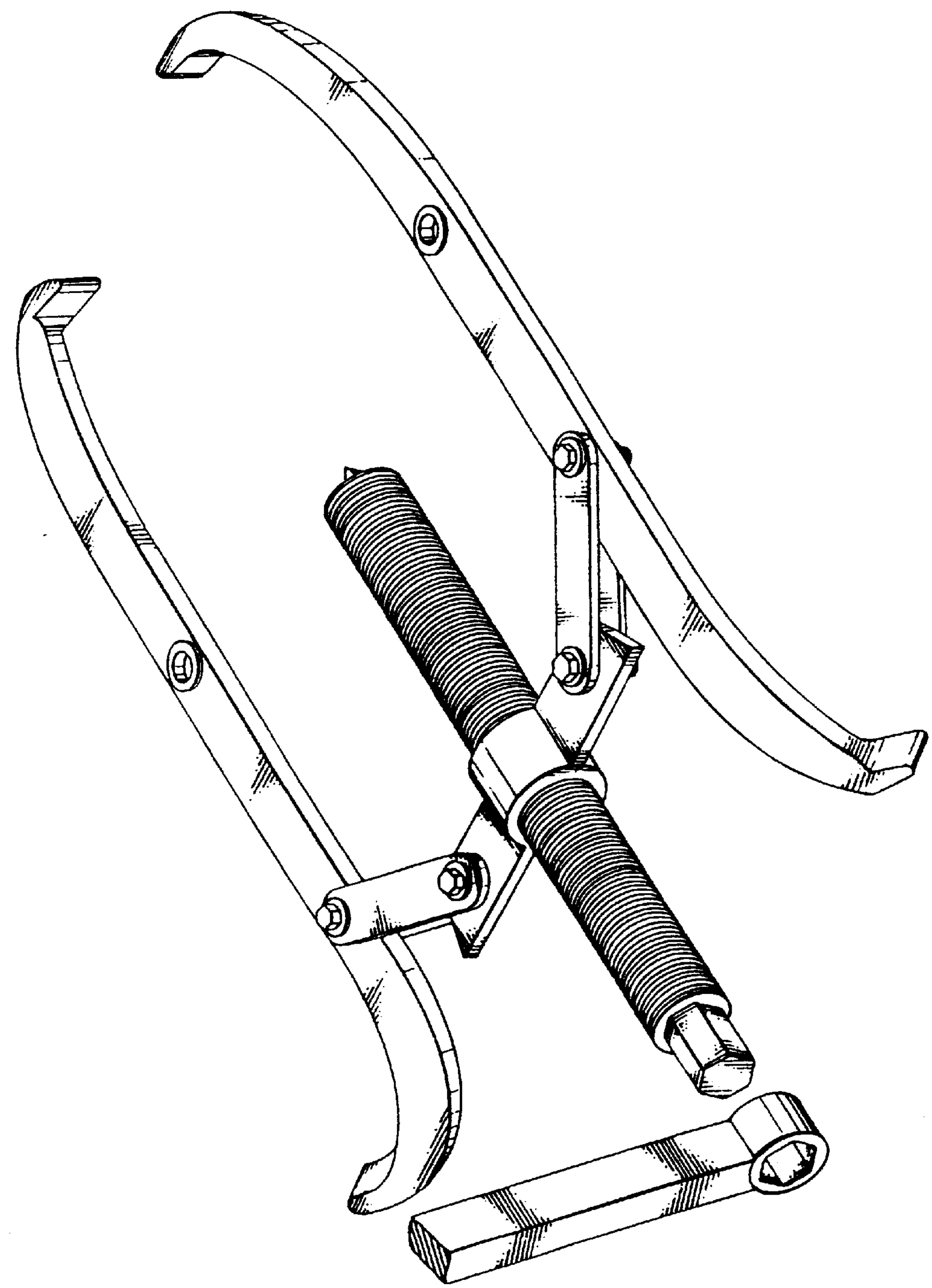
Fig. 1 PRIOR ART
FIG. 1 is an elevational view of a prior art puller.
Figure 2:
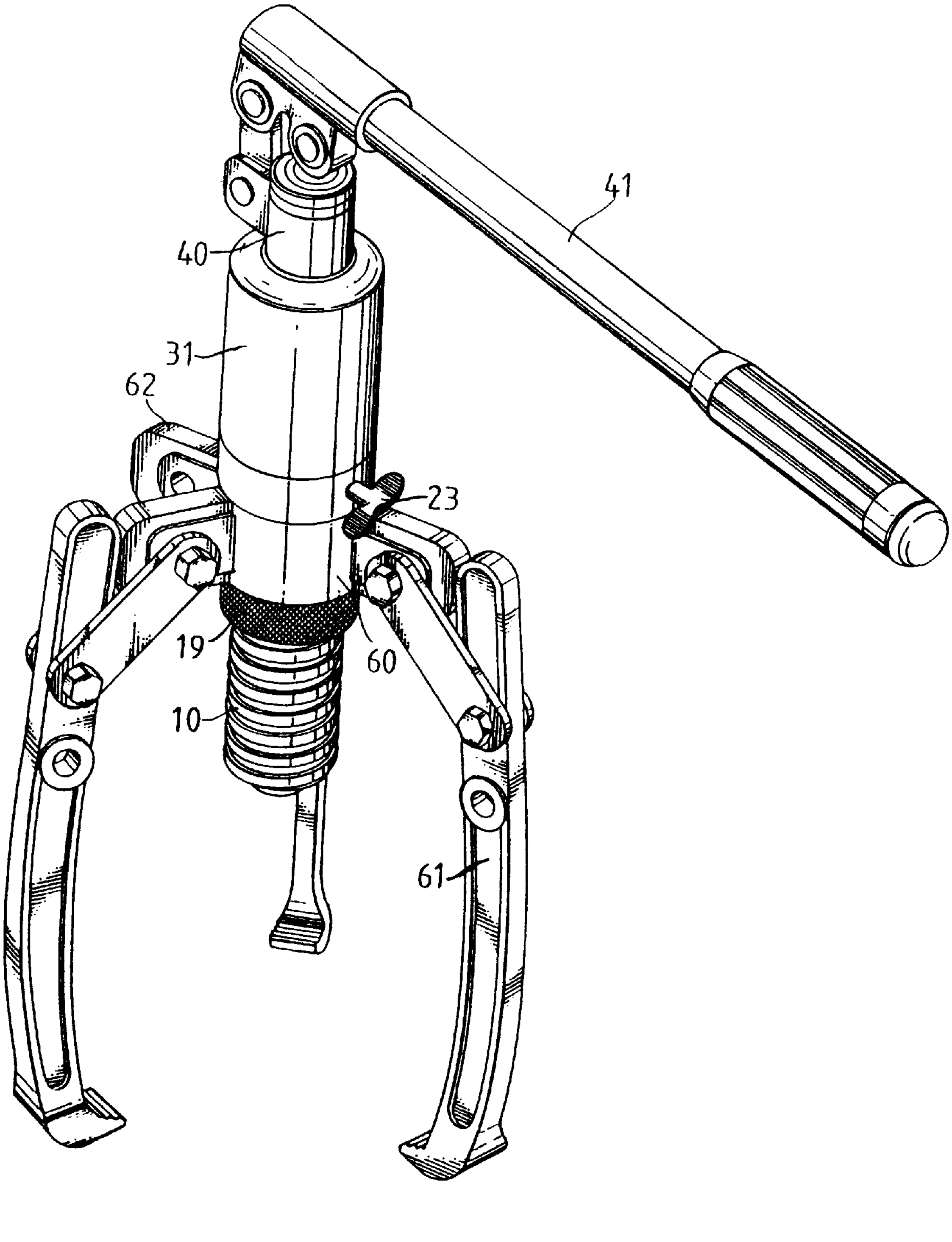
FIG. 2 is an elevational view of a hydraulic puller according to the present invention.
Figure 3:
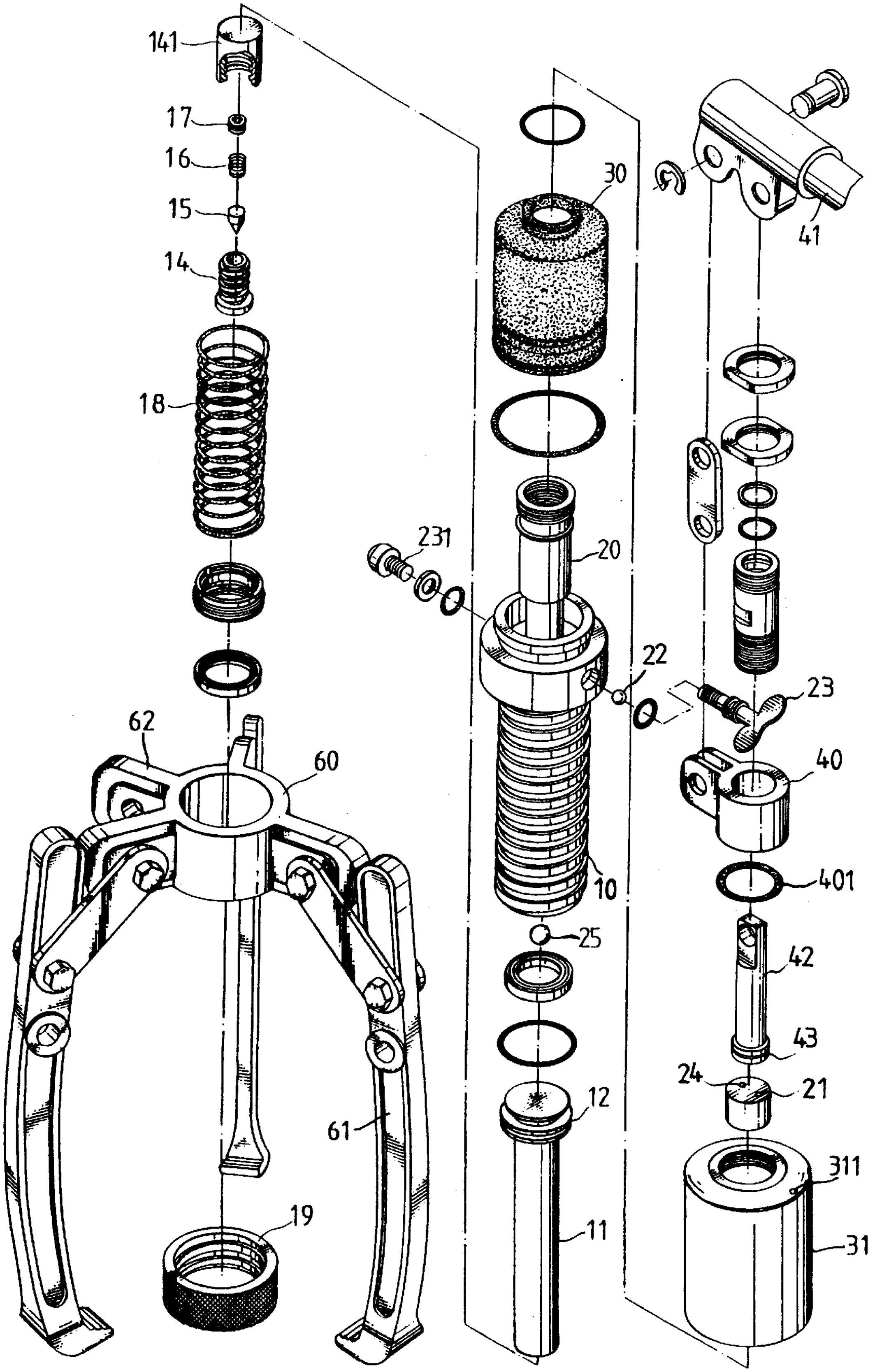
FIG. 3 is an exploded view of the hydraulic puller shown in FIG. 2.
Figure 4:
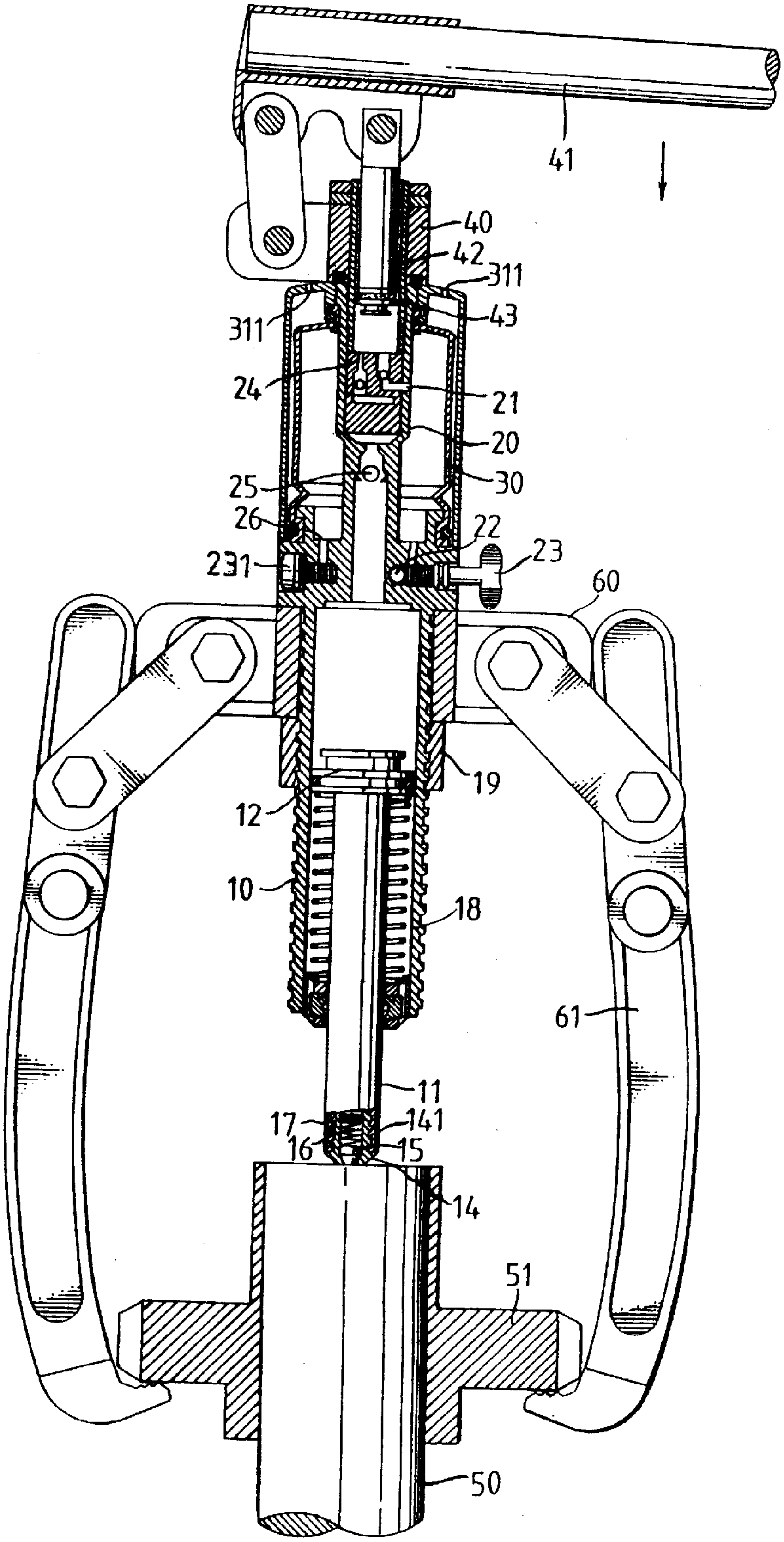
FIG. 4 is a cross sectional view of the hydraulic puller shown in FIG. 2, showing the hand lever depressed, and the movable rod moved downwards.
Figure 5:
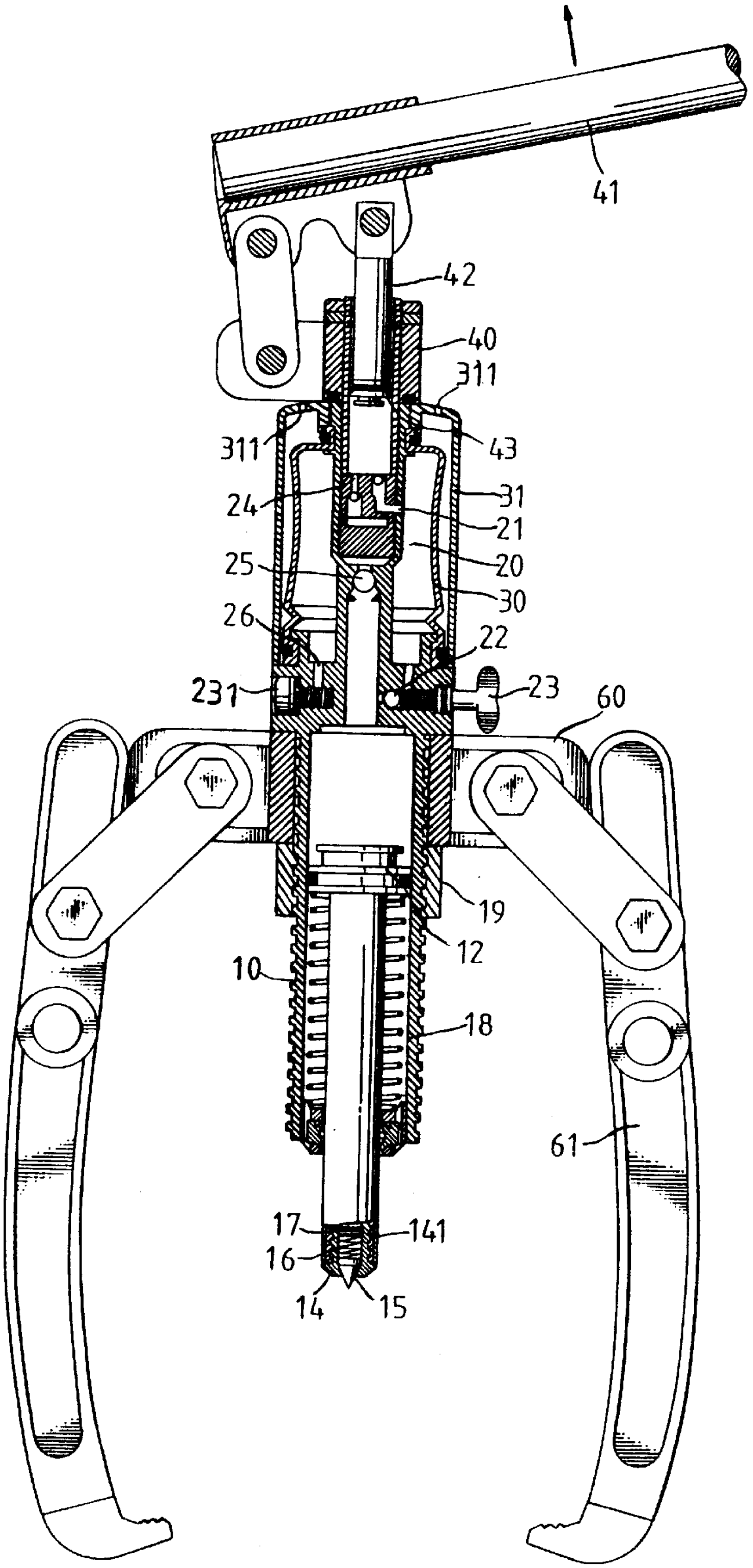
FIG. 5 is another sectional view of the hydraulic puller shown in FIG. 2, showing the hand lever lifted, and hydraulic oil flowed into the chamber below the piston rod.

Referring to FIGS. 2, 3, and 4, a hydraulic pipe 10 is fastened to a pawl seat 60, which holds a plurality of pawls 61. As shown in FIG. 7, the pawl seat 60 has a longitudinal sliding groove 601 for the sliding of the pawls 61. Each pawl 61 has a sliding portion 611 moved in the sliding groove 601, and an outer thread 612 at the top end. A lock nut 63 is respectively threaded onto the outer thread 612 of each pawl 61 to fix each pawl 61 in place. A movable rod 11 is mounted in the hydraulic pipe 10. A compression spring 18 is mounted around the movable rod 11 inside the hydraulic pipe 10. The movable rod 11 has a top end mounted with oil sealing ring 12 which divides the internal space of the hydraulic pipe 10 into two separate, closed chambers. The hydraulic pipe 10 has a unitary connection pipe 20 inserted into an air permeable oil container 30. The air permeable oil container 30 is covered by a casing 31, which has two air holes 311 at the top for letting air to pass in and out. The connecting pipe 20 of the hydraulic pipe 10 has an oil return hole 21 mounted with a valve 22 controlled by a screw 23, an oil outlet 24, an oil filling hole 26 sealed by a screw 231, an adjustment hole 27, a safety oil valve 234 fastened to the adjustment hole 27 by a rubber cushion 233 and a safety screw 232 to automatically regulate the inside pressure of the hydraulic pipe 10. There is also provided a rotating holder plate 40 inserted through the casing 31 and rotatably mounted around the connecting pipe 20, and a hand lever 41 pivoted to the holder plate 40 and driven to alternatively move a piston rod 42 up and down. The rotating holder plate 40 has a bottom end mounted with a cushion 401 inside the casing 31. The piston rod 42 has a piston ring 43 at the bottom end. Moving down the piston rod 42 causes the piston ring 43 to force hydraulic oil out of the oil container 30 through the oil outlet 24 into the hydraulic pipe 40 to move the movable rod 11. Inside the hydraulic pipe 10, there is a check valve 25 mounted between the connecting pipe 20 and the movable rod 11 to prohibit reverse flow of hydraulic oil. On the hydraulic pipe 10, a lock nut 19 is externally fastened to the hydraulic pipe 10 to firmly secure the pawl assembly 60 in place, and a stop ring 13 which is externally threaded is screwed into the bottom end of the hydraulic pipe 10 to stop the movable rod 11 from escaping out of the hydraulic pipe 10. The stop ring 13 has an exhaust hole 131 for exhausting compressed air during down stroke of the movable rod 11. The movable rod 11 has a bottom end fixedly mounted with a socket 141, which is screwed up with a hollow screw means 14 to hold a cone 15, a spring 16, and a bolt 17.

Figure 6:
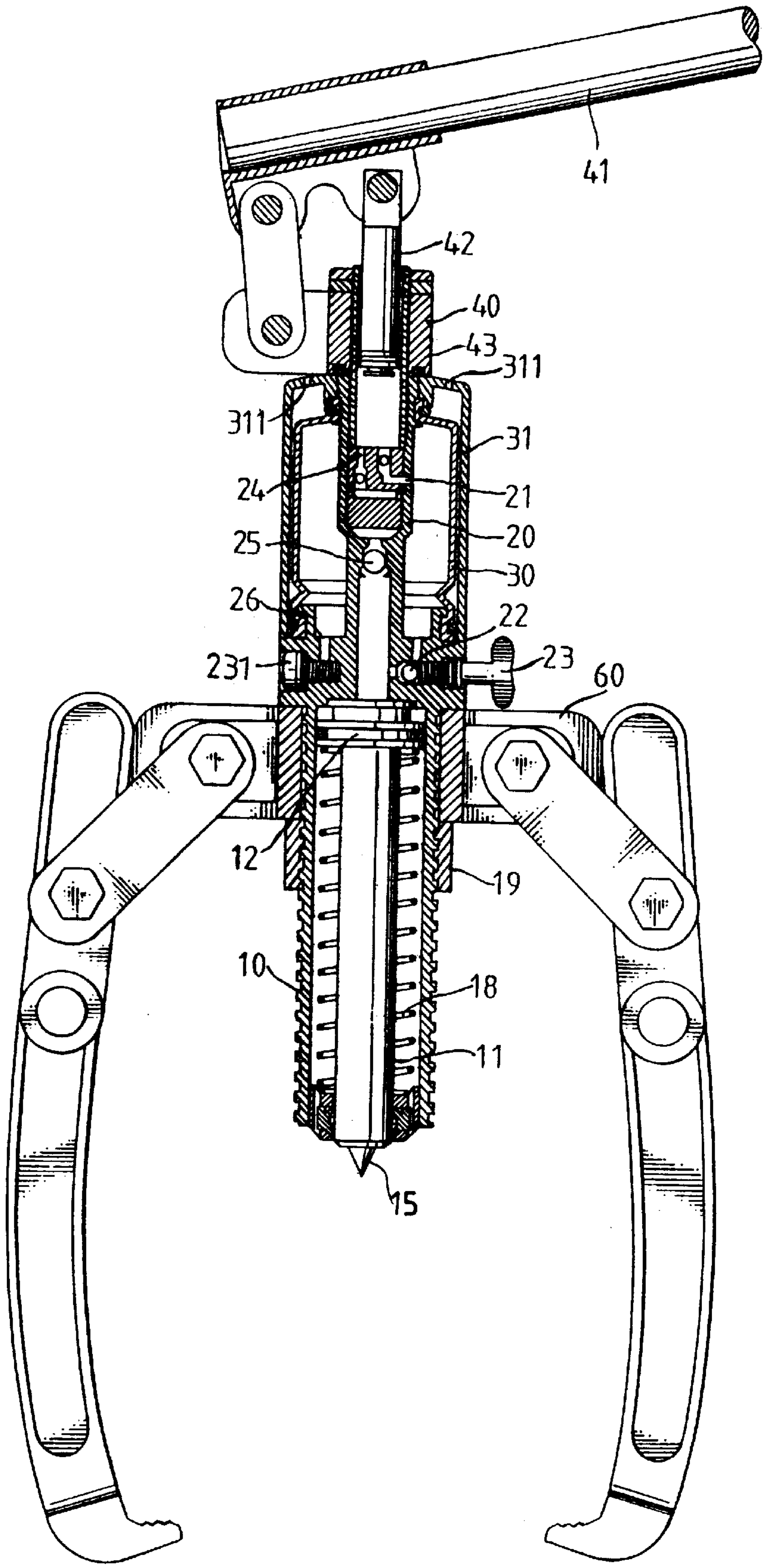
FIG. 6 is another sectional view of the present invention, showing the oil return valve control screw loosened, and hydraulic oil flowed back into the oil container.

Referring to FIGS. 5, 6, 7, and 8, and FIG. 4 again, the movable rod 11 is extended out of the hydraulic pipe 10 with the cone 15 stopped against the axle 50, and the pawls 61 are respectively hooked on the element 51 to be removed. Then, the hand lever 41 is depressed to force the piston ring 43 downwards, causing it to squeeze hydraulic oil out of the oil container 30 through the oil outlet 24 into the hydraulic pipe 10, and therefore the movable rod 11 is forced downwards by hydraulic oil, causing the pawl assembly 60 to move upwards relative to the movable rod 11. Then, the hand lever 41 is lifted to release the piston rod 42 from the oil container 30 (see FIG. 5). When the piston rod 42 is released from the oil container 30, hydraulic oil is induced to flow through the oil outlet 24 into the chamber below the piston ring 43 for a next squeezing operation. Therefore, repeatedly turning the hand lever 41 back and forth causes the pawls 61 of the pawl assembly 60 to remove the element 51 out of the axle 50. After the removable of the element 51 from the axle 50, the screw 23 is loosened, as shown in FIG. 6, permitting hydraulic oil to flow through the oil return valve 22 back into the oil container 30.

Figure 9:
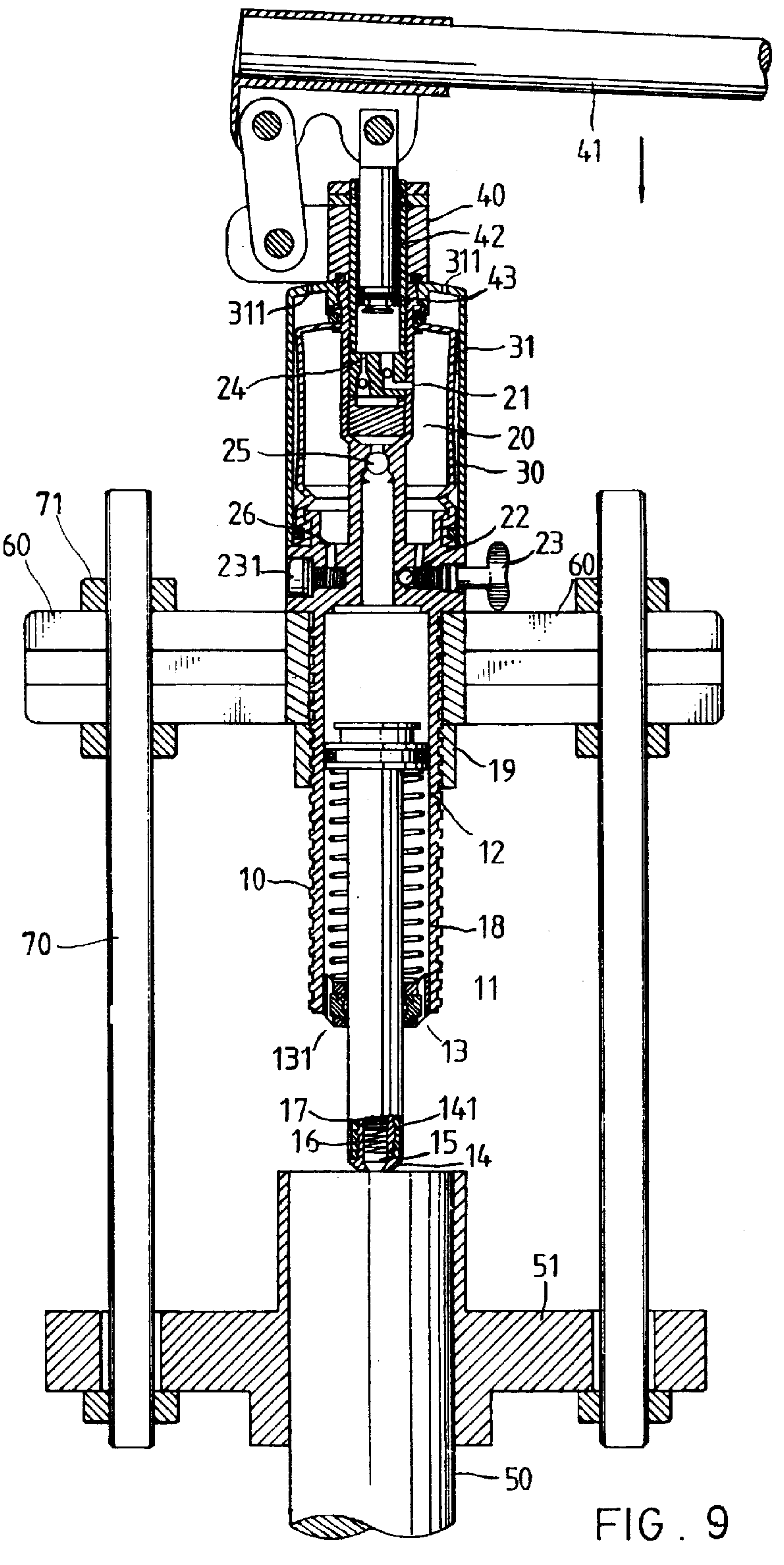
FIG. 9 shows an alternate form of the present invention.

FIG. 9 shows an alternate form of the present invention, in which screw rods 71 are used and fastened to the pawls seat 60 by lock nuts 72 to replace the aforesaid pawls 61.

I claim:

1. A hydraulic puller for removing an element from an axle comprising a hydraulic pipe, a pawl assembly mounted on said hydraulic pipe and adapted to catch an element to be removed from an axle, a rod movably fastened to said hydraulic pipe, an oil tank assembly connected to said hydraulic pipe by a connecting pipe, said oil tank assembly comprising an air permeable oil container filled with a hydraulic oil and covered by a casing, said casing having two air holes at two opposite locations, a hand lever, a piston rod moved by said hand lever for forcing said hydraulic oil out of said oil container and into said hydraulic pipe and causing said rod to move out of said hydraulic pipe, and spring means fastened to said hydraulic pipe to automatically move said rod back to a former position, wherein said connecting pipe has an adjustment hole communicating with said oil container, a safety oil valve and a safety screw are arranged in said adjustment hole, and a rubber cushion is arranged between said safety screw and said safety valve; said safety valve, said rubber cushion and said safety screw are arranged for automatically regulating an inside pressure of said hydraulic pipe; and said hand lever is pivoted to a holder plate rotatably mounted around said connecting pipe inside said casing.

* * * * *